US009668279B2

(12) United States Patent
Jen

(10) Patent No.: US 9,668,279 B2
(45) Date of Patent: May 30, 2017

(54) METHOD AND APPARATUS FOR HANDLING RANDOM ACCESS PROCEDURE IN A WIRELESS COMMUNICATIONS SYSTEM

(75) Inventor: Yu-Chih Jen, Taipei (TW)

(73) Assignee: INNOVATIVE SONIC LIMITED, Ebene (MU)

( * ) Notice: Subject to any disclaimer, the term of this patent is extended or adjusted under 35 U.S.C. 154(b) by 1595 days.

(21) Appl. No.: 12/052,756

(22) Filed: Mar. 21, 2008

(65) Prior Publication Data

US 2008/0233941 A1 Sep. 25, 2008

Related U.S. Application Data

(60) Provisional application No. 60/895,987, filed on Mar. 21, 2007, provisional application No. 60/945,948, filed on Jun. 25, 2007, provisional application No. 60/983,218, filed on Oct. 28, 2007.

(51) Int. Cl.
*H04W 4/00* (2009.01)
*H04M 3/00* (2006.01)
*H04W 74/00* (2009.01)
*H04W 74/08* (2009.01)

(52) U.S. Cl.
CPC ...... *H04W 74/002* (2013.01); *H04W 74/0833* (2013.01)

(58) Field of Classification Search
USPC ................................................ 370/329, 447
See application file for complete search history.

(56) References Cited

U.S. PATENT DOCUMENTS

| 7,328,013 | B2 * | 2/2008 | Vialen et al. ............... 455/432.1 |
| 2001/0018348 | A1 | 8/2001 | Joshi |
| 2003/0035423 | A1 | 2/2003 | Beckmann |
| 2005/0070252 | A1 * | 3/2005 | Farnsworth ............... 455/412.1 |
| 2008/0051091 | A1 * | 2/2008 | Phan et al. ..................... 455/436 |
| 2008/0233963 | A1 * | 9/2008 | Alanara et al. ............... 455/438 |
| 2009/0262681 | A1 * | 10/2009 | Park et al. ..................... 370/328 |
| 2010/0093386 | A1 * | 4/2010 | Damnjanovic ....... H04W 52/04 455/522 |

(Continued)

FOREIGN PATENT DOCUMENTS

EP 0760564 A2 3/1997
EP 1146762 A2 10/2001

(Continued)

OTHER PUBLICATIONS

3GPP, LG Electronics, "Discussion on Message 4 in Random Access", 3GPP TSG-RAN WG2 #57, R2-070519, St. Louis, USA, Feb. 15-19, 2007.

(Continued)

*Primary Examiner* — Chirag Shah
*Assistant Examiner* — Majid Esmaeilian
(74) *Attorney, Agent, or Firm* — Blue Capital Law Firm, P.C.

(57) ABSTRACT

A method for handling a random access procedure in a user equipment, called UE hereinafter, of a wireless communications system includes outputting a message 3 as a scheduled transmission not including a specific field indicating whether the UE has a cell Radio Network Temporary Identifier, called C-RNTI hereinafter, or not during the random access procedure.

8 Claims, 12 Drawing Sheets

(56) References Cited

U.S. PATENT DOCUMENTS

2010/0189071 A1* 7/2010 Kitazoe .............. H04W 74/002
370/331

FOREIGN PATENT DOCUMENTS

| EP | 1708369 A1 | 10/2006 |
| EP | 1753183 A2 | 2/2007 |
| JP | 2005536168 A | 11/2005 |
| WO | 00/70814 A1 | 11/2000 |
| WO | 01/43466 A1 | 6/2001 |
| WO | 2004042952 | 5/2004 |
| WO | WO 2008042889 A1 * | 4/2008 |
| WO | WO 2008055235 A2 * | 5/2008 |

OTHER PUBLICATIONS

Motorola: "Uplink synchronization maintenance and timing advance" 3GPP TSG RAN1#48, No. R1-070794, Feb. 12-16, 2007, pp. 1-3, XP002495110.
Motorola: "Non-synchronized random access usage" 3GPP TSG RAN1#48, No. R1-070760, Feb. 12-16, 2007, pp. 1-1, XP002495111.
Nokia: "Non contention based HO" 3GPP TSG-RAN WG2 Meeting #57, Feb. 12-16, 2007, pp. 1-6, XP002495112.
Asustek: "Issues related to RACH access" 3GPP TSG-RAN WG2#58, No. R2-072048, May 7-11, 2007, pp. 1-3, XP002495113.
IPWireless: "Contention-free Intra-LTE handover" 3GPP TSG-RAN WG2 Meeting #57, R2-070646, Feb. 12-16, 2007, pp. 1-4, XP002504221.
Method and Apparatus to improve LTE Random Access Procedure, 2007.
3GPP, (Sep. 2006), 3rd Generation Partnership Project; Technical Specification Group Radio Access Network; Medium Access Control (MAC) protocol specification.
3GPP, (Mar. 2007), 3rd Generation Partnership Project; Technical Specification Group Radio Access Network; Continuous connectivity for packet data users.
3GPP, (Jun. 2007), 3rd Generation Partnership Project; Technical Specification Group Radio Access Network; Evolved Universal Terrestrial Radio Access (E-UTRA) and Evolved Universal Terrestrial Radio Access Network.
3GPP TSG-RAN WG2 #56bis, Jan. 2007.
3GPP TSG-RAN WG2 Meeting #57, Feb. 2007.
3GPP TSG RAN WG2 #57, Feb. 2007.
Nokia, "Non-synchronized random access procedure" 3GPP TSG RAN WG1 LTE Ad Hoc, [Online] vol. R1-061901, Jun. 27-30, 2006, pp. 1-4, XP002503578, Cannes.
IPWireless, "Required address space calculation for Implicit C-RNTI assignment during (initial) RACH access", RAN2#54, [Online], Aug. 28, 2006-Sep. 1, 2006, pp. 1-5, vol. R2-062268, Tallinn, Estonia.
Asustek, "UE Identity validity in RA Procedure", 3GPP TSG-RAN WG2 #58-bis, [Online], Jun. 25-29, 2007, pp. 1-2, vol. R2-072897, XP002503580, Orlando, Florida, USA.
Ericsson, "On random access procedure msg4", 3GPP TSG-RAN WG2#56bis, [Online], Jan. 15-19, 2007, pp. 1-3, vol. R2-070249, XP002503581, Sorrento, Italy.
Anonymous, "G3G CDMA-DS to ANSI/TIA/EIA-41, TIA/EIA/IS-834", Jan. 1, 1900, XP017004519, Telecommunications Industry Association.
Li X, "Contention Resolution in Random-Access Wireless Networks Based on Orthogonal Complementary Codes", IEEE Transactions on Communications, IEEE Service Center, Piscataway, NJ, US, vol. 52, No. 1, Jan. 1, 2004, pp. 82-89, XP011106839, ISSN: 0090-6778.
3GPP Technical Specification Group Radio Access Network: "Evolved Universal Terrestrial Radio Access Network (E-UTRA) and Evolved Universal Terrestrial Radio Access Network (E-UTRAN); Overall description, Stage 2 (Release 8)" 3GPP TS 36.300 V1.0.0, [Online] Mar. 5, 2007, pp. 1-82, XP002489540.

* cited by examiner

METHOD AND APPARATUS FOR HANDLING RANDOM ACCESS PROCEDURE IN A WIRELESS COMMUNICATIONS SYSTEM

CROSS REFERENCE TO RELATED APPLICATIONS

This application claims the benefit of U.S. Provisional Application No. 60/895,987, filed on Mar. 3, 2007 and entitled "Method and Apparatus to improve LTE Random access procedure", the benefit of U.S. Provisional Application No. 60/945,948, filed on Jun. 25, 2007 and entitled "Method and Apparatus to optimize Random Access Procedure", and the benefit of U.S. Provisional Application No. 60/983,218, filed on Oct. 28, 2007 and entitled "Method and Apparatus to improve Random Access Procedure and related HARQ operation", the contents of which are incorporated herein by reference.

BACKGROUND OF THE INVENTION

1. Field of the Invention

The present invention relates to a method and apparatus for handling random access procedure in a wireless communications system, and more particularly, to a method and apparatus for implementing timing alignment and resource request, so as to enhance system efficiency.

2. Description of the Prior Art

The third generation mobile telecommunications system (called 3G system) provides high frequency spectrum utilization, universal coverage, and high quality, high-speed multimedia data transmission, and also meets all kinds of QoS requirements simultaneously, providing diverse, flexible, two-way transmission services and better communication quality to reduce transmission interruption rates. However, due to demand for high-speed and multimedia applications, the next generation mobile telecommunications technology and related communication protocols have been developed.

In the Long Term Evolution wireless communications system (LTE system), a Random Access Channel (RACH) is configured in an uplink (UL) channel between a user equipment (UE) and the network, and utilized for timing alignment, RNTI (Radio Network Temporary Identifier) assignment, and resource request. In the starting state, only downlink (DL) timing between UE and Node B (NB) is synchronized, and signals on RACH can be used for UL timing alignment. Before performing UL timing alignment, UE uses downlink Synchronization Channel or reference signals to perform synchronization on timing and frame. However, since signals may be delayed due to a distance between the transmitter and receiver, UE is not able to determine whether a message transmitted from UE is at a starting position of a receiving frame of NB. In addition, when NB provides service for multiple UEs at the same time, Round Trip Delays (RTDs) between each UE and NB may be different due to different distances thereof, causing timing offset. Therefore, NB evaluates timing offset of a UE according to RACH signals from the UE, and notifies the UE to adjusting UL timing via Downlink Shared Channel (DL-SCH), to achieve timing synchronization. A RACH signal is composed of preambles used for UL timing synchronization and UE identity detection, or carrying short signalling or signature.

On the other hand, RACH signals among different UEs are transmitted to NB by contention-based or non-contention-based method. That is, UE can select a RACH transmission opportunity and randomly select a preamble to transmit signals, or transmit a signal carrying a preamble assigned by the network (in such a situation, the RACH transmission opportunity is assigned by the network or selected by the UE). If the network cannot identify the transmitted RACH signal due to collision or low power, or if contention lost occurs due to a randomly-selected preamble, the UE can retransmit the RACH signal with larger power in the next available RACH transmission opportunity, until a response from the network is received or a condition is reached, e.g., maximum transmitting or maximum power.

For LTE, a RACH transmission opportunity is related to a time-frequency radio resource, not only related to time or frequency. Therefore, when RACH physical resource is selected, its time period and frequency band are determined. Of course, at certain time period, there may be more than one frequency sub-band for selection. On the other hand, preamble can be random access preamble, which is randomly selected by UE, or dedicated preamble, which is assigned by network (source cell or target cell). Basically, when UE uses (randomly selected) random access preamble, there is possibility another UE use the same preamble and transmit it in the same RACH opportunity so that network doesn't know whether the signal comes from one or more than one UE. Consequently, contention exists and will be solved after UE sends its UE identity in subsequent message 3. In contrary, dedicated preamble is assigned by network to a known specific UE so it's unique and won't cause contention between UEs (no another UE use the same dedicated preamble.)

In LTE, asynchronous RACH is concluded and adopted as working assumption where dedicated preamble and random access preamble based RACH accesses may both be supported. Random access procedure performance mainly in terms of latency and overhead is affected by collision/contention probability, time/frequency resources, number of user equipments (load), number of preamble signature, channel quality, UE identities, and even access causes and so on. On the other hand, the design requirements in addition to performance, such as short life span of identity usage, to be common for various kinds of non-synchronous RACH accesses in E-UTRAN (eNB and aGW) for FDD and TDD as well as irrespective of cell size, optimization for connected state UEs, are considered while possible reasons for UE to access on RACH can be categorized into four main causes, which are initial access (e.g. UE originated call, network originated call, tracking area update and initial cell access) including initial NAS signaling for NAS procedures (e.g. service request, network attach, routing/tracking area update), synchronization request, handover access and scheduling request. According to requirements and need of support for possible access causes, the baseline random access procedure model and channel mapping (between logical channels and transport channels) are defined in the prior art. Current decision on four steps of random access procedures is shown as following:

(1) Step "Random Access Preamble on RACH in uplink": is corresponding to a message 1, which carries 6 bits, and indicates a random ID, and possibly other information, e.g., cause or size, potentially with priority, pathloss or CQI to allocate UL resource appropriately.

(2) Step "Random Access Response on DL-SCH": is corresponding to a message 2, which is semi-synchronous (within a flexible window of which the size is one or more TTI) with message 1, no HARQ (Hybrid Automatic Repeat Request) support, transmitted on L1/L2+DL-SCH, addressed to RA-RNTI (Random Access RNTI) on L1/L2 control channel, conveys at least RA-preamble identifier, timing alignment information, initial UL grant and assignment of Temporary Cell RNTI (T-CRNTI), and is intended for one or multiple UEs in one DL-SCH message.

(3) Step "First scheduled UL transmission on UL-SCH": is corresponding to a message 3, which uses HARQ, operates in RLC TM (Radio Link Control Transparent Mode) without segmentation, conveys at least UE identifier and (explicit or implicit) information on whether C-RNTI is already available. Besides, in case of initial access and if the size of the message allows it, the initial NAS message (or something allowing to build the initial NAS message in eNB) can be included, and size of the message is dynamic.

(4) Step "Contention Resolution on DL-SCH": is corresponding to a message 4, which is not synchronized with message 3, and addressed to the Temporary C-RNTI on L1/L2 control channel (at least for initial access). Besides, content of the message is FFS (for further study), HARQ is supported, and HARQ feedback is transmitted only by the UE which detects its own UE identity, as provided in message 3, echoed in the RRC (Radio Resource Control) Contention Resolution message.

In the prior art, at initial access, the four steps are: Random Access Preamble on RACH, Random Access Response via CCCH (Common Control Channel) on DL-SCH, RRC Connection Request via CCCH on UL-SCH, and RRC Contention Resolution via DCCH on DL-SCH.

Therefore, for LTE, the prior art provides steps of RA procedure. However, some problems may occur.

First, during random access procedure, radio link failure, handover (e.g. changing new serving cell), and tracking area update can happen. It's possible that after an UE informs eNB (enhanced Node B) in message 3 about its already having C-RNTI (e.g. by index or provide its C-RNTI directly), the C-RNTI held by the UE may either have been released or become invalid before message 4 (e.g. message 4 is asynchronous to message 3 and three retransmissions are allowed) addressed by UE identity (e.g. can be invalid as well) is received by the UE. Consequently, for example, network may consider that the UE uses its original C-RNTI so as to relocate T-CRNTI assigned in message 2 to other random access UEs while the UE adopts the previous received T-CRNTI as its C-RNTI. In addition, according to unique (or unique in most cases) UE identity provided in message 3, network shall know whether the UE has C-RNTI already. It's unnecessary to provide notification of having C-RNTI to result in unnecessary overhead. Moreover, for some causes of initiation of random access (e.g. scheduling request) during which some scenarios could happen (e.g. synchronization request or tracking area update), the purpose of initiating RA may become not essential and critical after completion of random access procedure.

In UMTS, downlink resources are allocated by CRNC when HS-SCCH sets are configured/decided by NB. However, in LTE, there is no CRNC any more. It's not clear how network maintains the resource allocation and configuration. In addition, it's necessary to consider how continuous packet connectivity feature is fulfilled in LTE at handover.

In LTE, after a UE initiates random access procedure by sending a preamble (random access preamble or dedicated preamble), the UE should expect the random access response message for both contention-based and non-contention-based random access procedures from network if the network receives the preamble over RACH. In addition, the random access response message shall be addressed to a RA-RNTI corresponding to or uniquely identifying the accessing RACH time-frequency resource where the RACH accessing pattern (time-frequency within radio frame) is indicated. According to the procedure, network shall send the random access response message within flexible window (e.g. one or more TTI). However, if the network doesn't send random access response message earlier enough so that scheduled the same RACH time-frequency resource (identifying by the same RA-RNTI expected) is reached before reception of the response message (e.g. random access response message is received later than scheduled time slot of next period of the same RACH time-frequency resource within a radio frame or expected reception time for accesses at next period of the same RACH time-frequency resource within a radio frame), the problem will happen.

For example, UEs sending preambles at next period of the same RACH time-frequency resource expect the same associated RA-RNTI by wasting power in reception response message which actually is intended for UEs with access attempts at previous period of the same RACH time-frequency resource. Consequently, the power control mechanism for access attempts at next period of the same RACH time-frequency resource cannot work correctly to reflect the UL channel conditions between base station and UEs with access attempts at next period of the same RACH time-frequency resource so as to may further impact subsequent transmissions. Therefore, for contention based case, UEs with the same used random access preambles at next period of the same accessing opportunity may also consider the response message intended to the UEs with the same random access preambles sending at previous period of the same accessing opportunity is intended to them so that they will all send message 3 in UL where the network cannot really differentiate which UE accesses the RACH time-frequency resource in the previous period of the accessing pattern and which one accesses later. Therefore, it's unfair to the UE sending access attempts earlier.

On the other hand, for non-contention based cases, if the network doesn't carefully consider end time of a dedicated preamble for a UE with the response window (e.g. end time expires earlier than the instant of transmission of random access response message or expires earlier than the instant of reception of random access response message), the UE behaviour is unspecified and there may be two UEs receive the same timing alignment information which is especially serious to the non-contention based case since it doesn't have contention resolution message to resolve the contention problem. In addition, for contention based case, the delay on completion of random access event, UL interference and unnecessary power consumption will be increased.

Since in random access procedure message 4 is not synchronized to message 3, once a UE doesn't detect control channel information (addressing to it) or DTX/ACK happens, the UE may be delay (e.g. until finding T-CRNTI which is reassigned to others) or even wait for forever (e.g. network think T-CRNTI is adopted because of DTX/ACK so that won't assign to anyone else) if no specific action is specified.

In addition, if C-RNTI is used to address message 4 for RRC connected UE, after a UE sends message 3, the UE may wait for long time (e.g. until its assigned T-CRNTI is reused by a winner UE) or even forever (e.g. no winner UE uses the T-CRNTI) since message 4 is not synchronized to message 3.

When the C-RNTI of a UE is detected or known by network upon receive message 3, it's unnecessary to address T-CRNTI on L1/L2 control channel for winner UE since UE knows its own C-RNTI if there is one. The life span of T-CRNTI should be able to be terminated before estimated duration of reception of T-CRNTI is reached. Otherwise, the T-CRNTI may be out of stocks/in shortage or availability of T-CRNTI to a UE may be delayed.

For some random access causes (e.g. handover or synchronization request), network may assign dedicated preambles to some UEs going to initiate random access triggered by these causes to avoid (if there is enough RACH time/frequency resources) or reduce contention (if too many UEs asking for accesses). Since normally an UE receiving dedicated preamble is in connected state and its context is available at network entity beforehand, the network entity shall know whether the UE has C-RNTI or not beforehand. It seems that it's unnecessary to assign T-CRNTI in message 2 in this kind of scenario. On the other hand, even T-CRNTI may be considered necessarily to be issued, it's unnecessary to send whole T-CRNTI on DL-SCH which not only consumes radio resource but also limits the number of UEs which can be dealt with during random access procedure in message 2 (e.g. message size so that the number of UEs being able to receive message 2 is limited if we assume each UE requires certain amount of information length in message 2).

HARQ is supported for contention resolution message with allowing one retransmission. However, acknowledgment errors can lead to confusion between network and UEs. If DTX/ACK or NACK/ACK happens, for UEs originally without C-RNTI, the network will consider the UE adopts T-CRNTI as C-RNTI while the T-CRNTI is not actually used. In contrast, if ACK/NACK happens, the network will consider the UE doesn't adopt T-CRNTI as C-RNTI while the T-CRNTI is actually occupied. The further problem may occur when two UEs consider they have same C-RNTI.

In random access procedure, message 4 is supported by HARQ. Therefore, if DTX/ACK happens, the network may consider an assigned T-CRNTI is adopted as a UE's C-RNTI while it's released.

For both contention based and non-contention based random access procedure, no matter whether HARQ is supported for random access response message or not, a UE waiting for the response message should not send NACK to network corresponding to the response message. Otherwise, if acknowledgement errors happen (e.g. ACK/NACK or NACK/ACK), following UL-SCH transmission will result in radio disturbance and may be miss detected. In addition, the UE identity may be occupied at the UE but the network considers the UE identity is free to assign. Moreover, the dedicated preamble may still be used by the UE when the network assigns the same dedicated preamble to another UE.

NAS procedures, such as tracking area update (TAU), network attach (NA), and service request (SR), can be initiated when the UE is in LTE_IDLE or LTE_DETACHED. During these procedures, it's possible for NAS layer to initiate re-authentication even though it's relatively rare for cases of TAU and SR procedures. In addition, duration for completion of either TAU or SR procedure usually is quite short (note: for NA, duration of procedure might be quite long) so that it would be rare that a handover would be required within the duration. On the other hand, during initial NAS signaling such as NA, handover may need to be supported before S1 context has been available at eNB and RRC security has been established, shown as FIG. 2. However, some impacts may be expected (e.g. incomplete RRC context at eNB from S1, potential security attacks and denial of service request, necessity of UE capability sent over radio interface, necessity of forwarding of S1 and NAS signalling over X2 interface). The issue should be solved.

SUMMARY OF THE INVENTION

According to the claimed invention, a method for handling a random access procedure in a user equipment, called UE hereinafter, of a wireless communications system comprises outputting a message 3 as a scheduled transmission not comprising a specific field indicating whether the UE has a cell Radio Network Temporary Identifier, called C-RNTI hereinafter, or not during the random access procedure.

According to the claimed invention, a method for handling a random access procedure in a user equipment of a wireless communications system comprises outputting a message 3 to a network during the random access procedure; and starting a window or timer when sending out the message 3 during random access procedure.

According to the claimed invention, a method for handling a random access procedure in a network of a wireless communications system comprises when a user equipment, called UE hereinafter, with a cell Radio Network Temporary Identifier, called C-RNTI hereinafter, is considered loser at contention resolution, sending an additional indication to the UE or address to an original assigned Temporary C-RNTI without a UE identity or assign the original Temporary C-RNTI to other accessing UEs.

According to the claimed invention, a method for handling a random access procedure in a network of a wireless communications system comprises during the random access procedure, sending a message 4 conveying a user equipment, called UE hereinafter, identity received in a message 3 for contention resolution.

According to the claimed invention, a method for handling a random access procedure in a network of a wireless communications system comprises determining that a cell Radio Network Temporary Identifier, called C-RNTI hereinafter, is detected when a message 1 is received from a user equipment, called UE hereinafter.

According to the claimed invention, a method for handling a random access procedure in a user equipment, called UE hereinafter, of a wireless communications system comprises providing next attempt on the random access procedure when a UE identity thereof is no longer valid.

According to the claimed invention, a method for handling a random access procedure in a network of a wireless communications system comprises sending a retransmission of contention resolution message to a user equipment, called UE hereinafter; and using a mechanism to detect whether the T-CRNTI is not adopted as a C-RNTI or not before assigning to other UEs when only receiving NACK corresponding to the retransmission of contention resolution message or doesn't receive ACK from the UE.

According to the claimed invention, a method for handling a random access procedure in a network of a wireless communications system comprises sending a contention resolution message to a user equipment, called UE hereinafter, according to a T-CRNTI; and using a mechanism to detect or confirm whether the T-CRNTI is adopted as a C-RNTI by the UE or not after sending the contention resolution message.

According to the claimed invention, a method for handling a random access procedure in a network of a wireless communications system comprises setting a message 4 to comprise authentication and ciphering request or security mode command or attach accept or RRC connection setup during random access procedure of network attach of a UE.

According to the claimed invention, a communications device for accurately handling a random access procedure in a wireless communications system comprises a control circuit for realizing functions of the communications device; a processor installed in the control circuit, for executing a program code to command the control circuit; and a memory installed in the control circuit and coupled to the processor for storing the program code; wherein the program code comprises outputting a message 3 as a scheduled transmission not comprising a specific field indicating whether the UE has a cell Radio Network Temporary Identifier, called C-RNTI hereinafter, or not during the random access procedure.

According to the claimed invention, a communications device for accurately handling a random access procedure in a wireless communications system comprises a control circuit for realizing functions of the communications device; a processor installed in the control circuit, for executing a program code to command the control circuit; and a memory installed in the control circuit and coupled to the processor for storing the program code; wherein the program code comprises outputting a message 3 to a network during the random access procedure; and starting a window or timer when sending out the message 3 during random access procedure.

According to the claimed invention, a communications device for accurately handling a random access procedure in a wireless communications system comprises a control circuit for realizing functions of the communications device; a processor installed in the control circuit, for executing a program code to command the control circuit; and a memory installed in the control circuit and coupled to the processor for storing the program code; wherein the program code comprises when a user equipment, called UE hereinafter, with a cell Radio Network Temporary Identifier, called C-RNTI hereinafter, is considered loser at contention resolution, sending an additional indication to the UE or address to an original assigned Temporary C-RNTI without a UE identity or assign the original Temporary C-RNTI to other accessing UEs.

According to the claimed invention, a communications device for accurately handling a random access procedure in a wireless communications system comprises a control circuit for realizing functions of the communications device; a processor installed in the control circuit, for executing a program code to command the control circuit; and a memory installed in the control circuit and coupled to the processor for storing the program code; wherein the program code comprises determining that a cell Radio Network Temporary Identifier, called C-RNTI hereinafter, is detected when a message 1 is received from a user equipment, called UE hereinafter.

According to the claimed invention, a communications device for accurately handling a random access procedure in a wireless communications system comprises a control circuit for realizing functions of the communications device; a processor installed in the control circuit, for executing a program code to command the control circuit; and a memory installed in the control circuit and coupled to the processor for storing the program code; wherein the program code comprises providing next attempt on the random access procedure when a UE identity thereof is no longer valid.

According to the claimed invention, a communications device for accurately handling a random access procedure in a wireless communications system comprises a control circuit for realizing functions of the communications device; a processor installed in the control circuit, for executing a program code to command the control circuit; and a memory installed in the control circuit and coupled to the processor for storing the program code; wherein the program code comprises providing next attempt on the random access procedure when a UE identity thereof is no longer valid.

According to the claimed invention, a communications device for accurately handling a random access procedure in a wireless communications system comprises a control circuit for realizing functions of the communications device; a processor installed in the control circuit, for executing a program code to command the control circuit; and a memory installed in the control circuit and coupled to the processor for storing the program code; wherein the program code comprises sending a retransmission of contention resolution message to a user equipment, called UE hereinafter; and using a mechanism to detect whether the T-CRNTI is not adopted as a C-RNTI or not before assigning to other UEs when only receiving NACK corresponding to the retransmission of contention resolution message or doesn't receive ACK from the UE.

According to the claimed invention, a communications device for accurately handling a random access procedure in a wireless communications system comprises a control circuit for realizing functions of the communications device; a processor installed in the control circuit, for executing a program code to command the control circuit; and a memory installed in the control circuit and coupled to the processor for storing the program code; wherein the program code comprises sending a contention resolution message to a user equipment, called UE hereinafter, according to a T-CRNTI; and using a mechanism to detect or confirm whether the T-CRNTI is adopted as a C-RNTI by the UE or not after sending the contention resolution message.

According to the claimed invention, a communications device for accurately handling a random access procedure in a wireless communications system comprises a control circuit for realizing functions of the communications device; a processor installed in the control circuit, for executing a program code to command the control circuit; and a memory installed in the control circuit and coupled to the processor for storing the program code; wherein the program code comprises setting a message 4 to comprise authentication and ciphering request or security mode command or attach accept or RRC connection setup during random access procedure of network attach of a UE.

These and other objectives of the present invention will no doubt become obvious to those of ordinary skill in the art after reading the following detailed description of the preferred embodiment that is illustrated in the various figures and drawings.

DETAILED DESCRIPTION

Figure 12:
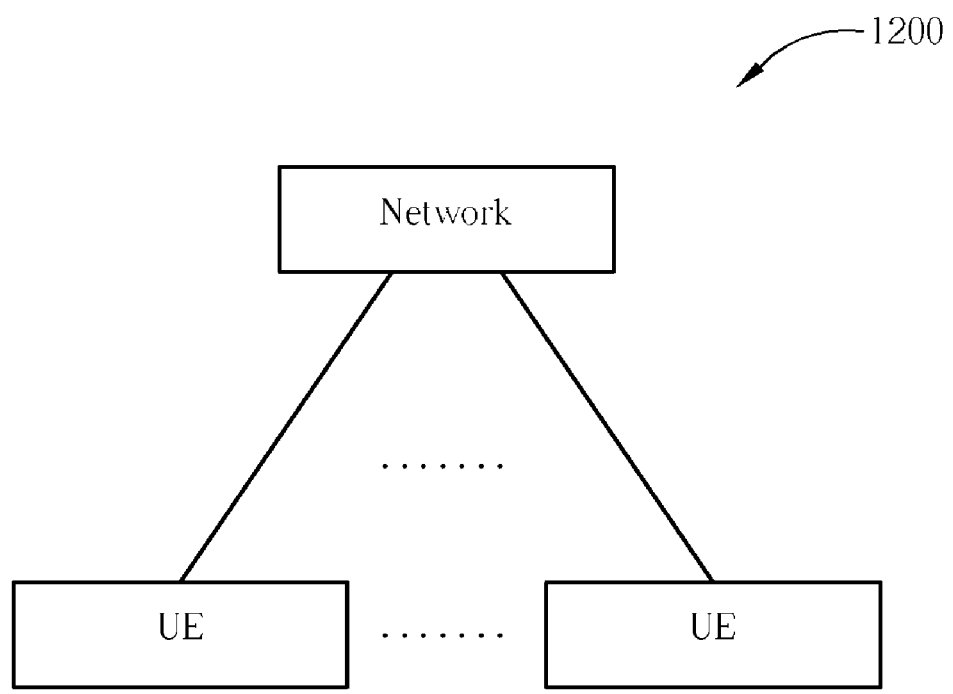
FIG. 12 is a schematic diagram of a wireless communications system.

Please refer to FIG. 12, which illustrates a schematic diagram of a wireless communications system 1200. The wireless communications system 1200 is preferably an LTE system, and is briefly composed of a network and a plurality of UEs. In FIG. 12, the network and the UEs are simply utilized for illustrating the structure of the wireless communications system 1200. Practically, the network terminal may comprise a plurality of base stations (or Node B), radio network controllers and so on according to actual demands, and the UEs can be devices such as mobile phones, computer systems, etc.

Figure 1:
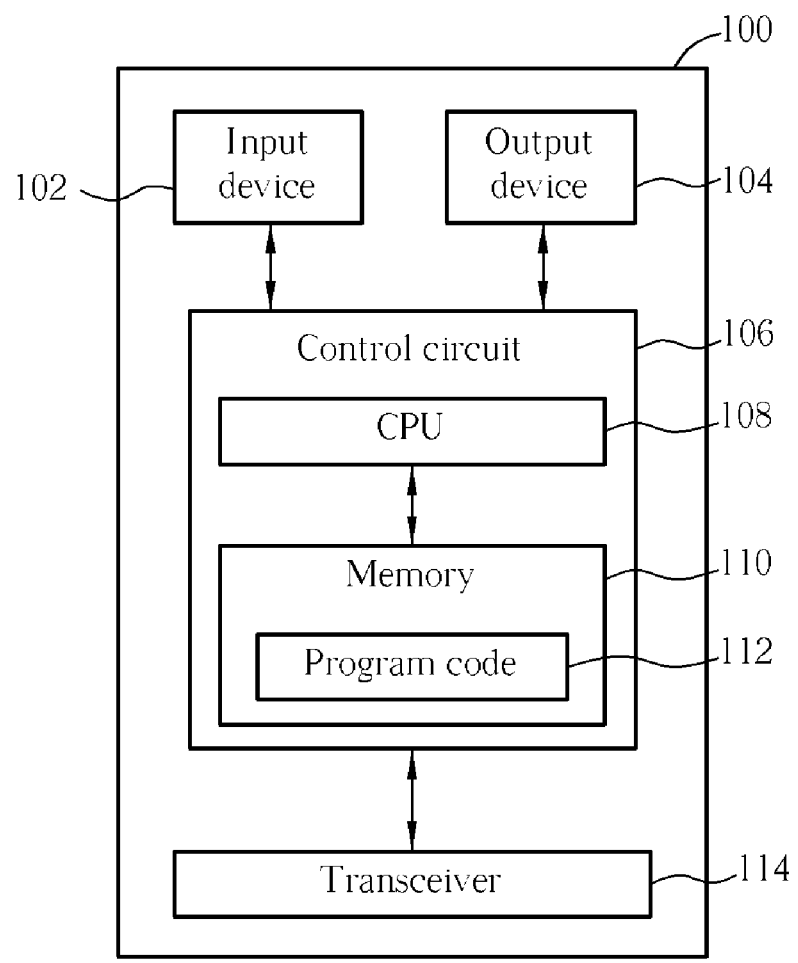
FIG. 1 is a function block diagram of a wireless communications device.

Please refer to FIG. 1, which is a functional block diagram of a communications device 100. The communications device 100 can be used for implementing the network and the UE shown in FIG. 12. For the sake of brevity, FIG. 1 only shows an input device 102, an output device 104, a control circuit 106, a central processing unit (CPU) 108, a memory 110, a program code 112, and a transceiver 114 of the communications device 100. In the communications device 100, the control circuit 106 executes the program code 112 in the memory 110 through the CPU 108, thereby controlling an operation of the communications device 100. The communications device 100 can receive signals input by a user through the input device 102, such as a keyboard, and can output images and sounds through the output device 104, such as a monitor or speakers. The transceiver 114 is used to receive and transmit wireless signals, delivering received signals to the control circuit 106, and outputting signals generated by the control circuit 106 wirelessly. From a perspective of a communications protocol framework, the transceiver 114 can be seen as a portion of Layer 1, and the control circuit 106 can be utilized to realize functions of Layer 2 and Layer 3. Preferably, the communications device 100 is utilized in a third generation (3G) mobile communications system.

Figure 2:
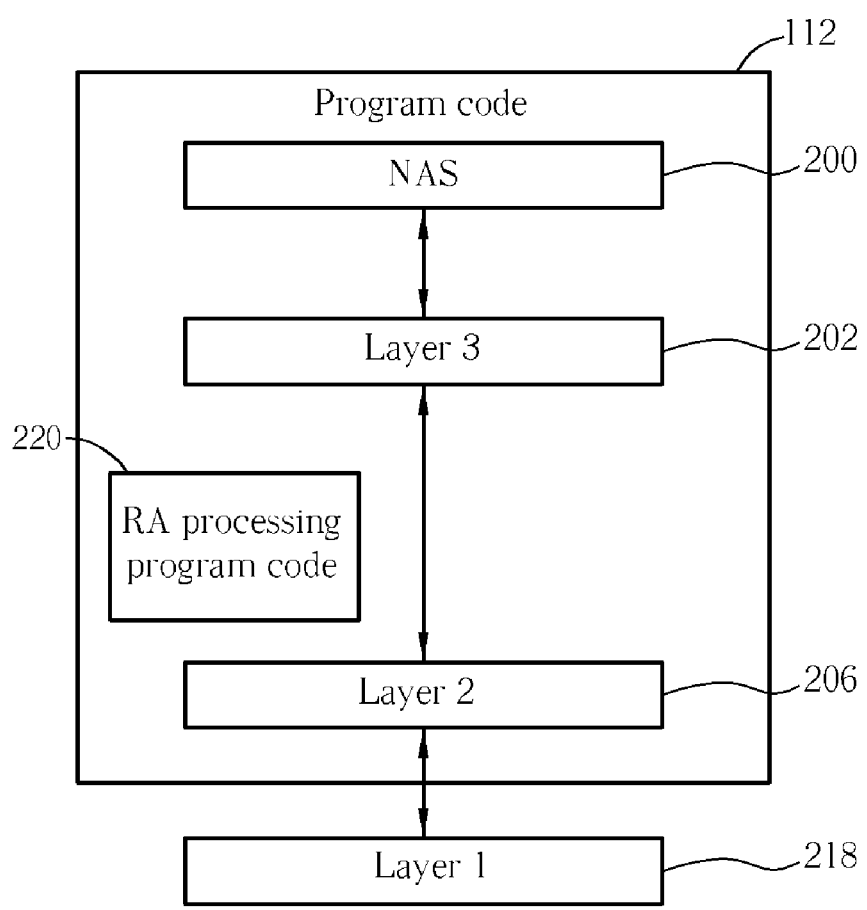
FIG. 2 is a diagram of program code of FIG. 1.

Please continue to refer to FIG. 2. FIG. 2 is a diagram of the program code 112 shown in FIG. 1. The program code 112 includes a Non Access Stratum (NAS) 200, a Layer 3 202, and a Layer 2 206, and is coupled to a Layer 1 218. The NAS 200 can generate NAS messages for realizing NAS applications. The Layer 3 202 is composed of an RRC layer, for performing radio resource control. The Layer 2 206 performs link control, and the Layer 1 218 performs physical connections. Whether a PDCP layer belongs to the Layer 3 202 or the Layer 2 206 is not relevant to this invention.

In order to achieve timing alignment and resource request, a RACH is configured in the communications device 100 for the random access procedure. In such a situation, the embodiment of the present invention provides a RA processing program code 220 for handling a random access procedure, so as to prevent the prior art problems. In the following, definitions of the messages 1, 2, 3, 4 are the same as what mentioned above. That is, the message 1 is corresponding to step "Random Access Preamble on RACH in uplink", the message 2 is corresponding to step "Random Access Response on DL-SCH", the message 3 is corresponding to step "First scheduled UL transmission on UL-SCH", and the message 4 is corresponding to step "Contention Resolution on DL-SCH."

Figure 3:
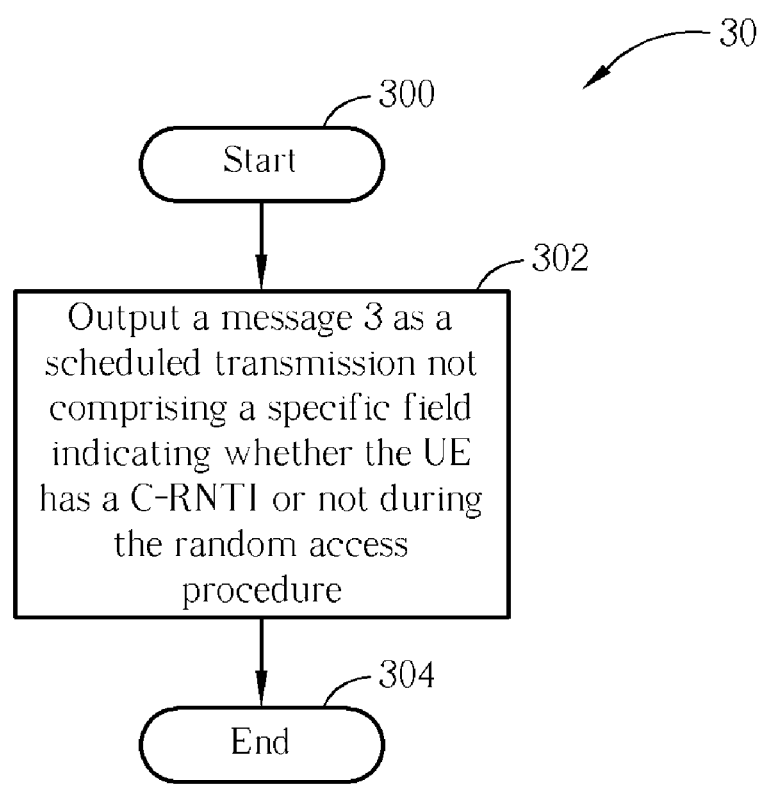
FIG. 3 to FIG. 11 are flowcharts of processes according to embodiments of the present invention.

Please refer to FIG. 3, which illustrates a schematic diagram of a process 30 according an embodiment of the present invention. The process 30 is utilized for handling a random access procedure in a UE of the wireless communications system 1200, and can be compiled into the RA processing program code 220. The process 30 comprises the following steps:

Step 300: Start.

Step 302: output a message 3 as a scheduled transmission not comprising a specific field indicating whether the UE has a C-RNTI or not during the random access procedure.

Step 304: End.

According to the process 30, message 3 outputted from the UE does not comprise a specific field indicating whether the UE has a C-RNTI or not during the random access procedure, so as to decrease overhead and enhance transmission efficiency.

In short, according to unique UE identity provided in message 3, network can know whether the UE has C-RNTI already, so that it's unnecessary to provide notification of having C-RNTI to result in unnecessary overhead. Therefore, in the embodiment of the present invention, the message 3 preferably comprises a field for UE identity and another field to indicate what kind identity is used as UE identity.

Therefore, via the process 30, message 3 outputted from the UE does not comprise a specific field indicating whether the UE has a C-RNTI or not during the random access procedure, so as to decrease overhead and enhance transmission efficiency.

Figure 9:
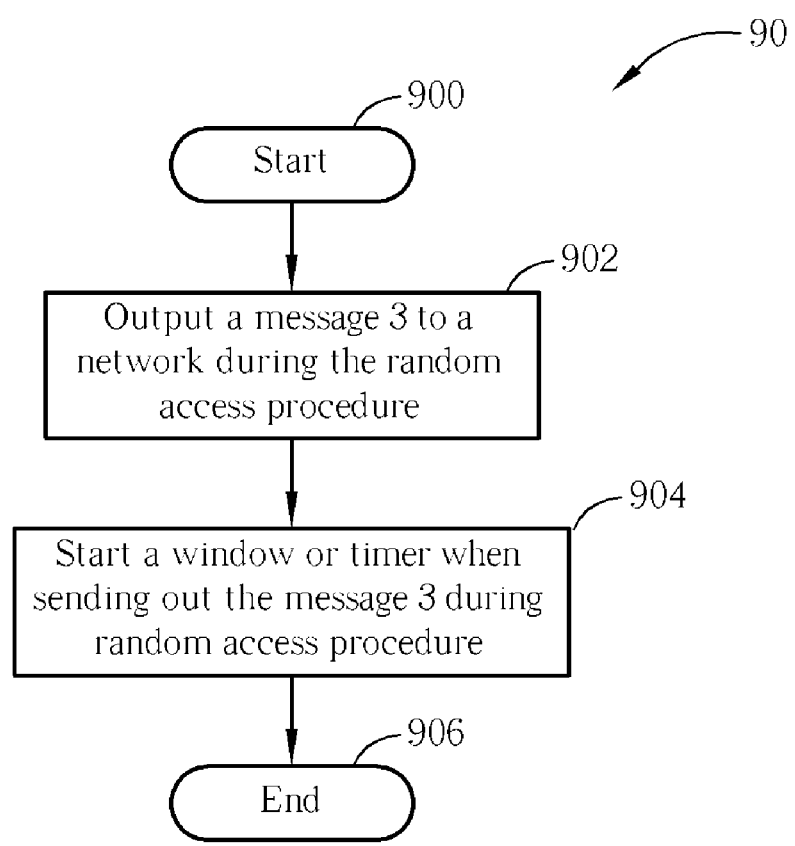

Please refer to FIG. 9, which illustrates a schematic diagram of a process 90 according an embodiment of the present invention. The process 90 is utilized for handling a random access procedure in a UE of the wireless communications system 1200, and can be compiled into the RA processing program code 220. The process 90 comprises the following steps:

Step 900: Start.

Step 902: Output a message 3 to a network during the random access procedure.

Step 904: Start a window or timer when sending out the message 3 during random access procedure.

Step 906: End.

According to the process 90, when the UE outputs the message 3, the embodiment of the present invention can start a window or timer. As a result, the embodiment of the present invention can restart the random access procedure when the window is reached or timer expires.

Preferably, the value of the window and timer is set according to a triggering event or QoS requirement of the event triggering the random access procedure or error handling consideration or against to the other timer. Moreover, the embodiment of the present invention starts the window or timer at a time critical event, such as a handover procedure. Furthermore, a message 4 outputted from the network is semi-synchronous to the message 3.

Therefore, via the process 90, when the UE outputs the message 3, the embodiment of the present invention can start a window or timer.

Figure 10:
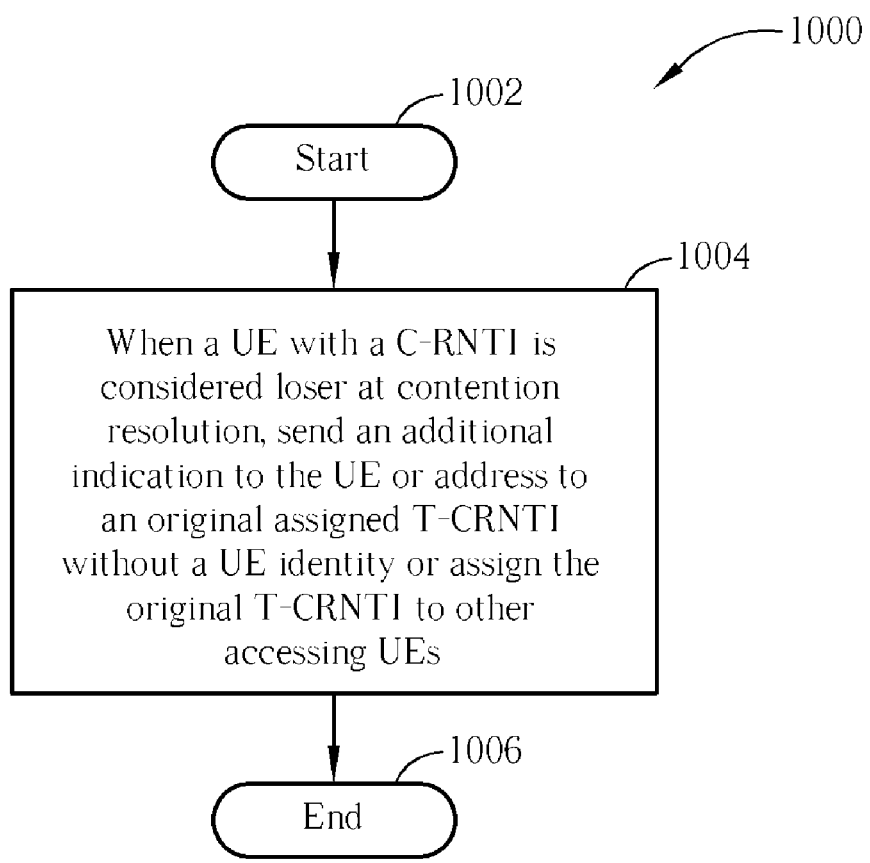

Please refer to FIG. 10, which illustrates a schematic diagram of a process 1000 according an embodiment of the present invention. The process 1000 is utilized for handling a random access procedure in a network of the wireless communications system 1200, and can be compiled into the RA processing program code 220. The process 1000 comprises the following steps:

Step 1002: Start.

Step 1004: When a UE with a C-RNTI is considered loser at contention resolution, send an additional indication to the UE or address to an original assigned T-CRNTI without a UE identity or assign the original T-CRNTI to other accessing UEs.

Step 1006: End.

According to the process 1000, when a UE with a C-RNTI is considered loser at contention resolution, the network sends an additional indication to the UE or addresses to an original assigned T-CRNTI without a UE identity or assigns the original T-CRNTI to other accessing UEs.

Preferably, once the UE receives the additional indication or the T-CRNTI, the UE knows it is a loser of contention in the random access procedure.

Therefore, via the process 1000, the network provides different operations on loser UEs.

Figure 4:
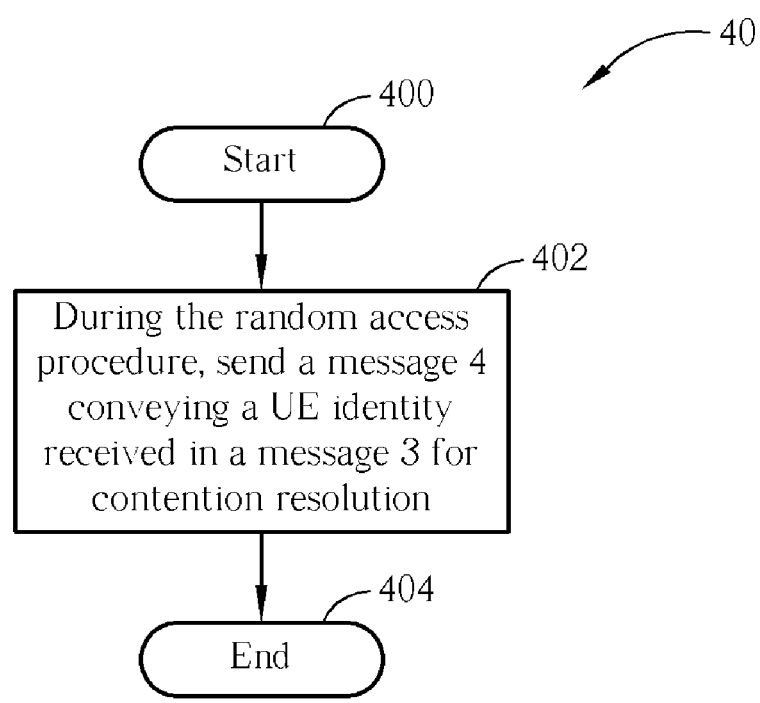

Please refer to FIG. 4, which illustrates a process 40 according to an embodiment of the present invention. The process 40 is utilized for handling a random access procedure in a network of the wireless communications system 1200, and can be compiled into the RA processing program code 220. The process 40 comprises the following steps:

Step 400: Start.

Step 402: During the random access procedure, send a message 4 conveying a UE identity received in a message 3 for contention resolution.

Step 404: End.

According to the process 40, a message 4 sent from the network conveys a UE identity received in a message 3 for contention resolution during the random access procedure.

Preferably, in the embodiment of the present invention, the network can use a C-RNTI of the UE or a T-CRNTI corresponding to the UE, to address the message 4 to the UE. In such a situation, if the network uses the temporary C-RNTI to address the message 4 to the UE, the UE shall adopt the T-CRNTI as the C-RNTI. Oppositely, if the network uses the C-RNTI of the UE to address the message 4 to the UE, the UE keeps using the C-RNTI.

In addition, preferably, the network can detect the C-RNTI according to the UE identity in the message 3, and release the T-CRNTI and allowing assigning the T-CRNTI to other random UEs when the C-RNTI is detected.

As mentioned above, it's possible that after an UE informs eNB in message 3 about its already having C-RNTI (e.g. by index or provide its C-RNTI directly), the C-RNTI held by the UE may either have been released or become invalid before message 4 (e.g. message 4 is asynchronous to message 3 and three retransmissions are allowed) addressed by UE identity (e.g. can be invalid as well) is received by the UE. Consequently, for example, network may consider that the UE uses its original C-RNTI so as to relocate T-CRNTI assigned in message 2 to other random access UEs while the UE adopts the previous received T-CRNTI as its C-RNTI. In comparison, in the embodiment of the present invention, the network can detect the C-RNTI according to the UE identity in the message 3, and release the T-CRNTI and allowing assigning the T-CRNTI to other random UEs when the C-RNTI is detected.

Therefore, via the process 40, a message 4 sent from the network conveys a UE identity received in a message 3 for contention resolution during the random access procedure.

Figure 11:
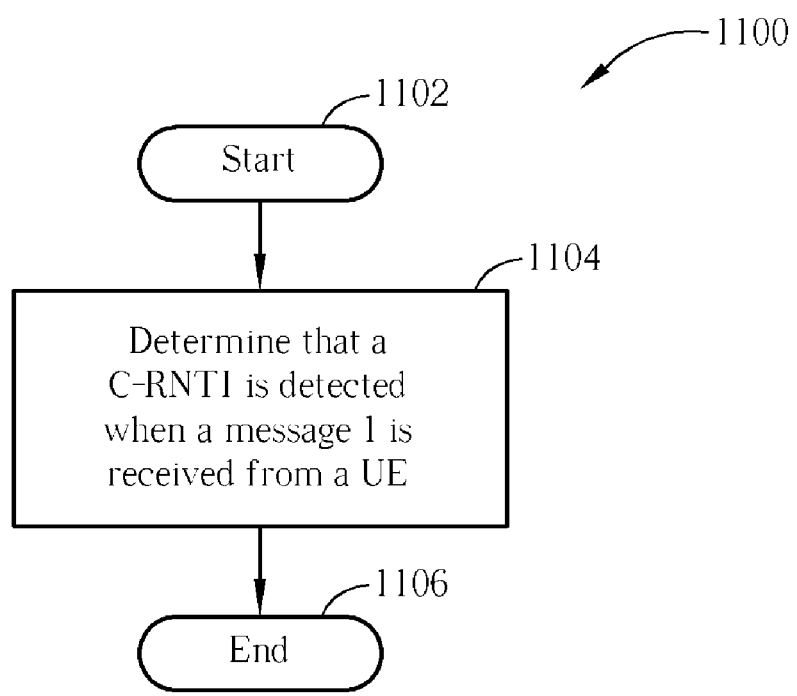

Please refer to FIG. 11, which illustrates a process 1100 according to an embodiment of the present invention. The process 1100 is utilized for handling a random access procedure in a network of the wireless communications system 1200, and can be compiled into the RA processing program code 220. The process 1100 comprises the following steps:

Step 1102: Start.

Step 1104: determine that a C-RNTI is detected when a message 1 is received from a UE.

Step 1106: End.

According to the process 1100, when a message 1 is received from a UE, the network determines that a C-RNTI is detected.

Preferably, the embodiment of the present invention does not assign a temporary C-RNTI in message 2 to the UE. The embodiment of the present invention only assigns a special temporary C-RNTI to the UE, where the special temporary C-RNTI is of shorter length, or in special format, for addressing of message 4. Otherwise, the embodiment of the present invention determines that the C-RNTI is detected upon reception of a dedicated preamble.

Moreover, in the embodiment of the present invention, the UE does not expect the assignment of another temporary C-RNTI, and determines whether there is an assignment of a temporary C-RNTI or whether the C-RNTI is known or detected by the network according to field indication in the message 2.

Therefore, via the process 1100, when a message 1 is received from a UE, the network determines that a C-RNTI is detected.

Figure 5:
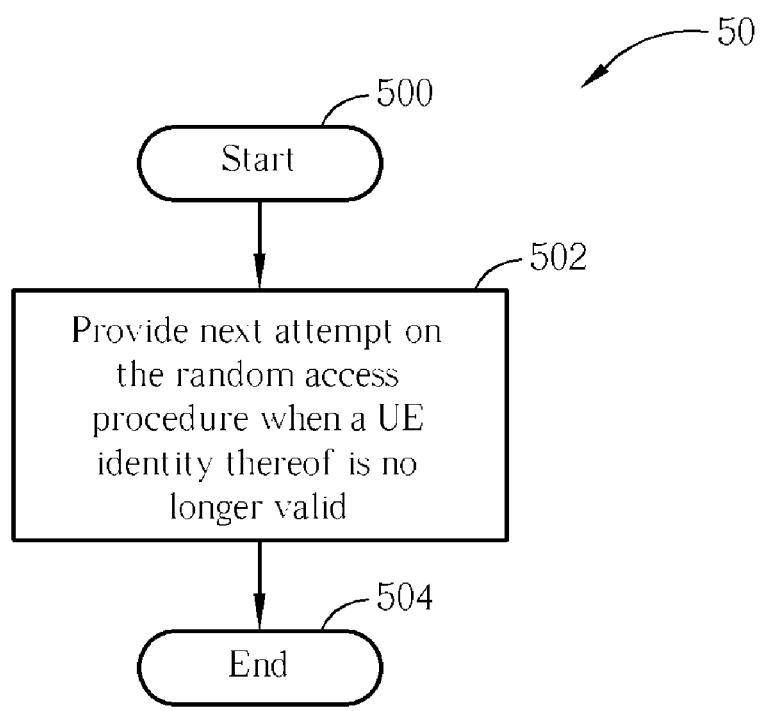

Please refer to FIG. 5, which illustrates a process 50 according to an embodiment of the present invention. The process 50 is utilized for handling a random access procedure in a UE of the wireless communications system 1200, and can be compiled into the RA processing program code 220. The process 50 comprises the following steps:

Step 500: Start.

Step 502: Provide next attempt on the random access procedure when a UE identity thereof is no longer valid.

Step 504: End.

According to the process 50, when a UE identity is no longer valid, the UE can provide next attempt on the random access procedure.

As mentioned above, it's possible that after an UE informs eNB in message 3 about its already having C-RNTI (e.g. by index or provide its C-RNTI directly), the C-RNTI held by the UE may either have been released or become invalid before message 4 (e.g. message 4 is asynchronous to message 3 and three retransmissions are allowed) addressed by UE identity (e.g. can be invalid as well) is received by the UE. In such a situation, the embodiment of the present invention can provide next attempt on the random access procedure when a UE identity is no longer valid. Preferably, the UE or a network can discard the invalid UE identity, or the UE randomly selects a UE identity on the random access procedure upon location area change. The invalid UE identity is discarded by the network when the invalid UE identity is not yet assigned to the UE.

Therefore, via the process 50, when a UE identity is no longer valid, the UE can provide next attempt on the random access procedure.

Figure 6:
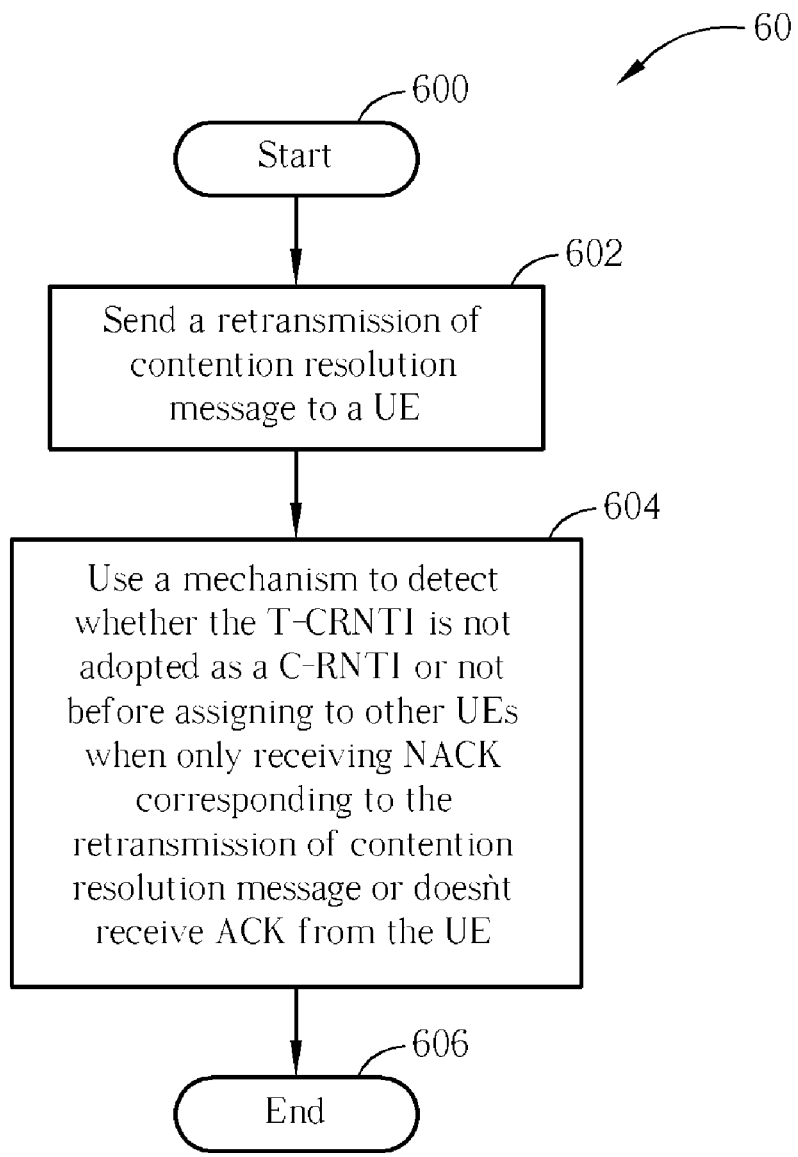

Please refer to FIG. 6, which illustrates a process 60 according to an embodiment of the present invention. The process 60 is utilized for handling a random access procedure in a network of the wireless communications system 1200, and can be compiled into the RA processing program code 220. The process 60 comprises the following steps:

Step 600: Start.

Step 602: Send a retransmission of contention resolution message to a UE.

Step 604: Use a mechanism to detect whether the T-CRNTI is not adopted as a C-RNTI or not before assigning to other UEs when only receiving NACK corresponding to the retransmission of contention resolution message or doesn't receive ACK from the UE.

Step 606: End.

According to the process 60, after sending a retransmission of contention resolution message to a UE, the network uses a mechanism to detect whether the T-CRNTI is not adopted as a C-RNTI or not before assigning to other UEs when only receiving NACK corresponding to the retransmission of contention resolution message or doesn't receive ACK from the UE.

As mentioned above, since in random access procedure message 4 is not synchronized to message 3, once a UE doesn't detect control channel information (addressing to it)

or DTX/ACK happens, the UE may be delay (e.g. until finding T-CRNTI which is reassigned to others) or even wait for forever (e.g. network think T-CRNTI is adopted because of DTX/ACK so that won't assign to anyone else) if no specific action is specified. In comparison, after sending a retransmission of contention resolution message to a UE, the network uses a mechanism to detect whether the T-CRNTI is not adopted as a C-RNTI or not before assigning to other UEs when only receiving NACK corresponding to the retransmission of contention resolution message or doesn't receive ACK from the UE. The mechanism can be:

(a1) Determine whether an UE with a UE identity in a contention resolution message indicate its C-RNTI or owning of a C-RNTI in an uplink message.

(b1) Send a downlink message addressed by the said T-CRNTI and see whether there is any response.

(c1) Wait to see whether there is any UE using the said T-CRNTI.

(d1) Assign a dedicated preamble to the said T-CRNTI.

(e1) Check whether the said UE has RRC connection.

In addition, the network preferably assumes that the said UE doesn't have a C-RNTI originally before sending the contention resolution message or before assigning the T-CRNTI. When the contention resolution message is intended for more than one UE, the mechanism is applied to any UE without ACK response to the contention Therefore, via the process 60, after sending a retransmission of contention resolution message to a UE, the network uses a mechanism to detect whether the T-CRNTI is not adopted as a C-RNTI or not before assigning to other UEs when only receiving NACK corresponding to the retransmission of contention resolution message or doesn't receive ACK from the UE.

Figure 7:
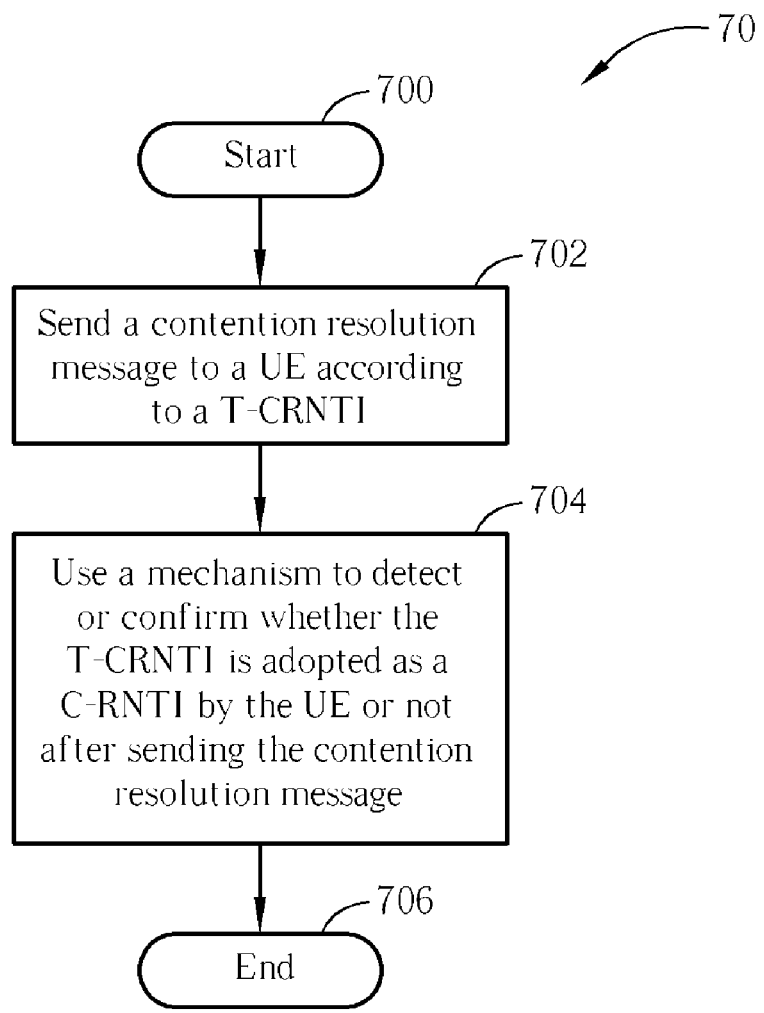

Please refer to FIG. 7, which illustrates a process 70 according to an embodiment of the present invention. The process 70 is utilized for handling a random access procedure in a network of the wireless communications system 1200, and can be compiled into the RA processing program code 220. The process 70 comprises the following steps:

Step 700: Start.

Step 702: Send a contention resolution message to a UE according to a T-CRNTI.

Step 704: Use a mechanism to detect or confirm whether the T-CRNTI is adopted as a C-RNTI by the UE or not after sending the contention resolution message.

Step 706: End.

According to the process 70, when network sends a contention resolution message to a UE according to a T-CRNTI, the network can use a mechanism to detect or confirm whether the T-CRNTI is adopted as a C-RNTI by the UE or not after sending the contention resolution message.

As mentioned above, since in random access procedure message 4 is not synchronized to message 3, once a UE doesn't detect control channel information (addressing to it) or DTX/ACK happens, the UE may be delay (e.g. until finding T-CRNTI which is reassigned to others) or even wait for forever (e.g. network think T-CRNTI is adopted because of DTX/ACK so that won't assign to anyone else) if no specific action is specified. In comparison, in the embodiment of the present invention, when network sends a contention resolution message to a UE according to a T-CRNTI, the network can use a mechanism to detect or confirm whether the T-CRNTI is adopted as a C-RNTI by the UE or not after sending the contention resolution message. The mechanism can be:

(a2) Mandate the UE to use the C-RNTI or a UE identity in following uplink message.

(b2) Respond to following uplink message from the UE with a UE identity of the UE on downlink.

(c2) Wait for another procedure using the C-RNTI or a UE identity.

(d2) Assign a dedicated preamble to the UE with the C-RNTI.

(e2) Check whether the UE with the C-RNTI has RRC connection.

Moreover, the UE doesn't have a C-RNTI originally before sending the contention resolution message or before assigning the T-CRNTI. When the contention resolution message is intended for more than one UE, the mechanism is applied to any UE without ACK response to the contention resolution message. The embodiment of the present invention can send a paging or search message addressed to a C-RNTI to check whether more than one UE occupying the C-RNTI, to request the response of additional UE identity.

Moreover, the mechanism is taking the T-CRNTI as the C-RNTI of the UE, and triggering a procedure with UL transmission using the assigned T-CRNTI as C-RNTI of the UE, such as a measurement report by the UE.

Therefore, via the process 70, when network sends a contention resolution message to a UE according to a T-CRNTI, the network can use a mechanism to detect or confirm whether the T-CRNTI is adopted as a C-RNTI by the UE or not after sending the contention resolution message.

Figure 8:
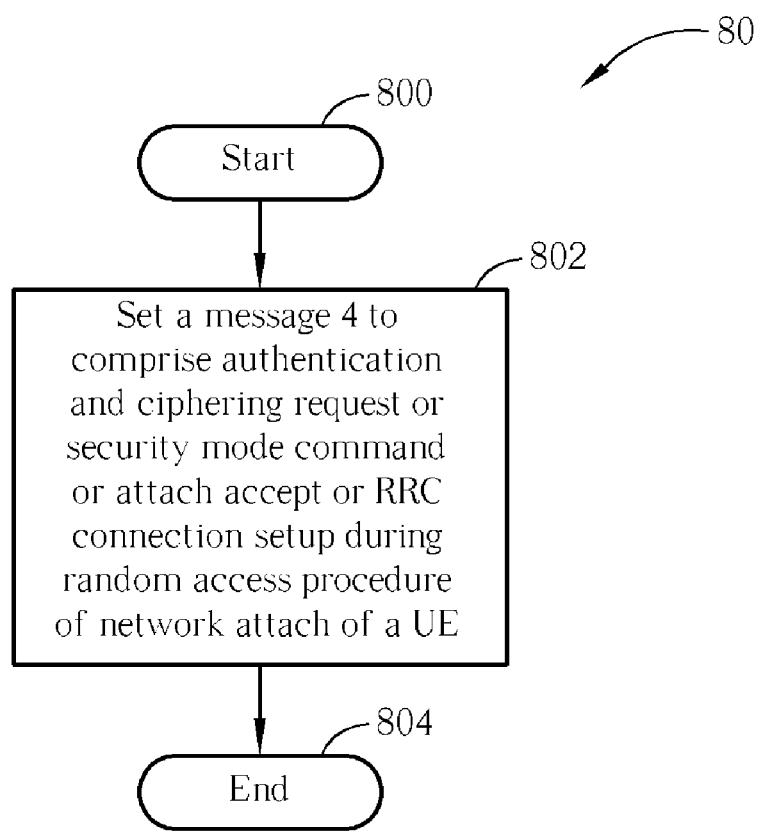

Please refer to FIG. 8, which illustrates a process 80 according to an embodiment of the present invention. The process 80 is utilized for handling a random access procedure in a network of the wireless communications system 1200, and can be compiled into the RA processing program code 220. The process 80 comprises the following steps:

Step 800: Start.

Step 802: Set a message 4 to comprise authentication and ciphering request or security mode command or attach accept or RRC connection setup during random access procedure of network attach of a UE.

Step 804: End.

According to the process 80, in the embodiment of the present invention, the network can set a message 4 to comprise authentication and ciphering request or security mode command or attach accept or RRC connection setup during random access procedure of network attach of a UE. As a result, some impacts may be expected (e.g. incomplete RRC context at eNB from S1, potential security attacks and denial of service request, necessity of UE capability sent over radio interface, necessity of forwarding of S1 and NAS signalling over X2 interface). The issue can be solved.

Therefore, via the process 80, the network can set a message 4 to comprise authentication and ciphering request or security mode command or attach accept or RRC connection setup during random access procedure of network attach of a UE.

In summary, the embodiment of the present invention provides different operations of the random access procedure, to achieve timing alignment and resource request.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for handling a random access procedure in a network of a wireless communications system comprising:
triggering, at a User Equipment (UE), a random access procedure;
receiving a random access response after triggering the random access procedure;
transmitting a message in response to receiving the random access response;
receiving a contention resolution from an eNB after transmitting a message in response to receiving the random access response during the random access procedure, wherein the eNB informs the UE, through the contention resolution, of an adoption of a Temporary Cell Radio Network Temporary Identifier (C-RNTI) of the UE that already has a C-RNTI other than the Temporary C-RNTI;
detecting the random access procedure success; and
deciding whether to adopt the Temporary C-RNTI based on whether the contention resolution is addressed to the Temporary C-RNTI, wherein when the contention resolution is received after receiving the random access response and is addressed to the Temporary Cell Radio Network Temporary Identifier (C-RNTI) of the UE that already has a C-RNTI, the UE adopts the Temporary C-RNTI as a new C-RNTI of the UE; and when the contention resolution is addressed to the C-RNTI of the UE, the UE keeps using the C-RNTI.

2. The method of claim 1, wherein a message 3 is transmitted in response to receiving a random access response after triggering a random access procedure, and wherein receiving a contention resolution during the random access procedure comprises receiving a message 4.

3. The method of claim 2, wherein the message 4 is corresponding to a step "Contention Resolution on DL-SCH", and the message 3 is corresponding to a step "First scheduled Uplink transmission on uplink shared channel".

4. The method of claim 1, wherein the C-RNTI that the UE already has is an invalid C-RNTI.

5. A communications device for handling a random access procedure in a wireless communications system comprising:
a control circuit;
a processor installed in the control circuit; and
a memory installed in the control circuit and coupled to the processor;
wherein the processor executes a program code stored in memory to:
trigger, at a User Equipment (UE), a random access procedure;
receive a random access response after triggering the random access procedure;
transmit a message in response to receiving the random access response;
receive a contention resolution from an eNB after transmitting a message in response to receiving the random access response during, the random access procedure, wherein the eNB informs the UE, through the contention resolution, of an adoption of a Temporary Cell Radio Network Temporary Identifier (C-RNTI) of the UE that already has a C-RNTI other than the Temporary C-RNTI;
detect the random access procedure success; and
decide whether to adopt the Temporary C-RNTI based on whether the contention resolution is addressed to the Temporary C-RNTI, wherein when the contention resolution is received after receiving the random access response and is addressed to the Temporary Cell Radio Network Temporary Identifier (C-RNTI) of the UE that already has a C-RNTI, the UE adopts the Temporary C-RNTI as a new C-RNTI of the UE; and when the contention resolution is addressed to the C-RNTI of the UE, the UE keeps using the C-RNTI.

6. The system of claim 5, wherein a message 3 is transmitted in response to receiving a random access response after triggering a random access procedure, and wherein receiving a contention resolution during the random access procedure comprises receiving a message 4.

7. The system of claim 6, wherein the message 4 is corresponding to a step "Contention Resolution on DL-SCH", and the message 3 is corresponding to a step "First scheduled Uplink transmission on uplink shared channel".

8. The system of claim 5, wherein the C-RNTI that the UE already has is an invalid C-RNTI.

* * * * *